United States Patent
Nakao

(10) Patent No.: US 11,468,269 B2
(45) Date of Patent: Oct. 11, 2022

(54) ARITHMETIC DEVICE, ARITHMETIC METHOD, AND DISCRIMINATION SYSTEM

(71) Applicant: SONY CORPORATION, Tokyo (JP)

(72) Inventor: Daisuke Nakao, Tokyo (JP)

(73) Assignee: SONY CORPORATION, Tokyo (JP)

( * ) Notice: Subject to any disclaimer, the term of this patent is extended or adjusted under 35 U.S.C. 154(b) by 27 days.

(21) Appl. No.: 16/982,843

(22) PCT Filed: Mar. 19, 2019

(86) PCT No.: PCT/JP2019/011408
§ 371 (c)(1),
(2) Date: Sep. 21, 2020

(87) PCT Pub. No.: WO2019/188578
PCT Pub. Date: Oct. 3, 2019

(65) Prior Publication Data
US 2021/0374480 A1    Dec. 2, 2021

(30) Foreign Application Priority Data
Mar. 28, 2018  (JP) .............................. JP2018-063256

(51) Int. Cl.
*G06K 9/00* (2022.01)
*G06K 9/62* (2022.01)
(Continued)

(52) U.S. Cl.
CPC ............ *G06K 9/6262* (2013.01); *G06T 5/001* (2013.01); *G06T 7/001* (2013.01); *G06T 2207/30108* (2013.01)

(58) Field of Classification Search
CPC ....... G06K 9/6262; G06T 5/001; G06T 7/001; G06T 2207/30108; G06T 7/00; H04N 5/232
See application file for complete search history.

(56) References Cited

U.S. PATENT DOCUMENTS

2009/0060447 A1* 3/2009 Nakao .................. G11B 31/006
                                                    386/354
2009/0232409 A1* 9/2009 Marchesotti ............ G06T 5/001
                                                    382/254
(Continued)

FOREIGN PATENT DOCUMENTS

CN           1989524 A     6/2007
JP       2013-140040 A     7/2013
(Continued)

OTHER PUBLICATIONS

English translation of JP 2016-046610, Apr. 4, 2016.*
(Continued)

*Primary Examiner* — Samir A Ahmed
(74) *Attorney, Agent, or Firm* — Chip Law Group

(57) ABSTRACT

The performance of a discriminator is improved at low cost. An image quality parameter group in the development processing is obtained so that the discrimination success rate of a discriminator based on developed image data obtained by performing the development processing on captured image data is increased. For example, the discrimination success rate is obtained by comparing a discrimination result from the discriminator with the correct answer discrimination result in a ground truth database. Since the image quality parameter group in the development processing is optimized in accordance with a discriminator, a preprocessing unit for enhancing the discrimination performance of the discriminator is unnecessary. The performance of a discriminator can be improved at low cost.

7 Claims, 6 Drawing Sheets

(51) Int. Cl.
   *G06T 5/00*        (2006.01)
   *G06T 7/00*        (2017.01)

(56) References Cited

U.S. PATENT DOCUMENTS

| | | | | |
|---|---|---|---|---|
| 2009/0266985 | A1* | 10/2009 | Nakahira | G06T 7/11 |
| | | | | 250/311 |
| 2012/0207381 | A1* | 8/2012 | Ong | G01N 21/9501 |
| | | | | 382/141 |
| 2013/0170734 | A1 | 7/2013 | Uchiyama et al. | |
| 2013/0177232 | A1* | 7/2013 | Hirano | G06T 7/001 |
| | | | | 382/141 |

FOREIGN PATENT DOCUMENTS

| | | | |
|---|---|---|---|
| JP | 2016-046610 A | 4/2016 | |
| JP | 2017-161487 A | 9/2017 | |

OTHER PUBLICATIONS

International Search Report and Written Opinion of PCT Application No. PCT/JP2019/011408, dated Jun. 11, 2019, 07 pages of ISRWO.

Office Action for CN Patent Application No. 201980020879.7, dated Dec. 2, 2021, 05 pages of English Translation and 06 pages of Office Action.

* cited by examiner

ARITHMETIC DEVICE, ARITHMETIC METHOD, AND DISCRIMINATION SYSTEM

CROSS REFERENCE TO RELATED APPLICATIONS

This application is a U.S. National Phase of International Patent Application No. PCT/JP2019/011408 filed on Mar. 19, 2019, which claims priority benefit of Japanese Patent Application No. JP 2018-063256 filed in the Japan Patent Office on Mar. 28, 2018. Each of the above-referenced applications is hereby incorporated herein by reference in its entirety.

TECHNICAL FIELD

The present technology relates to an arithmetic device, an arithmetic method, a program, and a discrimination system, and more particularly to, for example, an arithmetic device capable of generally using an automatic discriminator at a production site.

BACKGROUND ART

In a production line and the like in a factory and the like, for example, an automatic discriminator is used for inspecting manufactured products (e.g., see Patent Document 1). The automatic discriminator, however, is often optimized in accordance with a production line. For example, in a case where the production line is changed, the automatic discriminator that has been used in the production line before the change is not necessarily optimal for the production line after the change.

CITATION LIST

Patent Document

Patent Document 1: Japanese Patent Application Laid-Open No. 2017-161487

SUMMARY OF THE INVENTION

Problems to be Solved by the Invention

An object of the present technology is to provide, for example, an arithmetic device capable of generally using an automatic discriminator.

Solutions to Problems

A concept of the present technology is an arithmetic device including an image quality parameter group acquisition unit that acquires an image quality parameter group in development processing so that a discrimination success rate of a discriminator based on developed image data obtained by performing the development processing on captured image data is increased.

In the present technology, an image quality parameter group acquisition unit acquires an image quality parameter group in development processing so that the discrimination success rate of a discriminator based on developed image data obtained by performing development processing on captured image data is increased. For example, the discrimination success rate may be obtained by comparing a discrimination result from the discriminator with a correct answer discrimination result in the ground truth database.

Furthermore, for example, a discrimination success rate calculation unit that determines a discrimination success rate on the basis of a discrimination result from the discriminator may be further provided.

As described above, in the present technology, an image quality parameter group in the development processing is optimized in accordance with a discriminator. Therefore, for example, an arithmetic device capable of generally using an automatic discriminator can be provided.

Effects of the Invention

According to the present technology, the performance of a discriminator can be improved at low cost. Note that the effect described here is not necessarily limited, and either of the effects described in the present disclosure may be exhibited.

MODE FOR CARRYING OUT THE INVENTION

An embodiment for carrying out the invention (hereinafter referred to as an "embodiment") will be described below. Note that the description will be given in the following order.

1. Embodiment
2. Variations

<1. Embodiment>
[Camera Image Quality Adjustment System]

Figure 1:
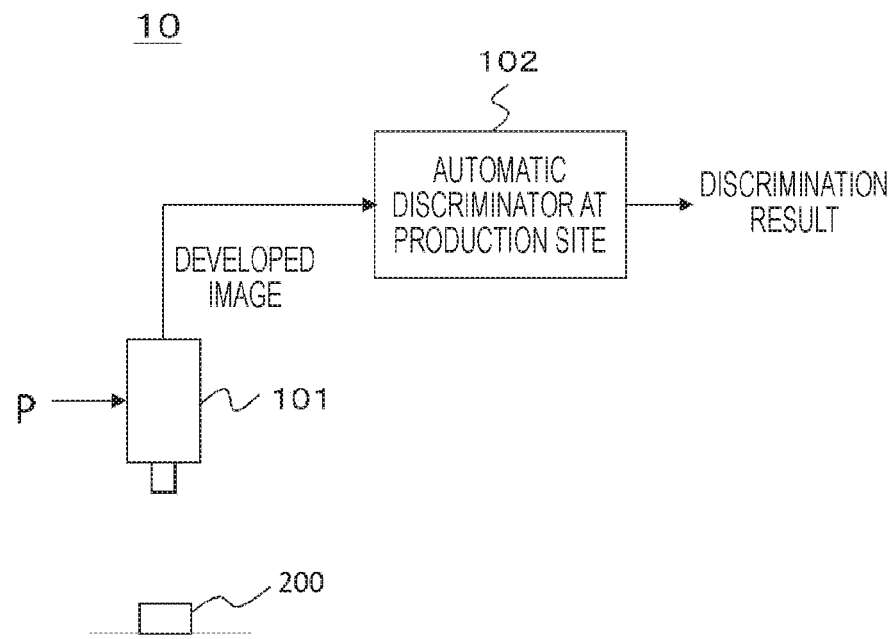
FIG. 1 is a block diagram illustrating a configuration example of a discrimination system at a production site.

First, a discrimination system at a production site will be described. FIG. 1 illustrates a configuration example of 10 of a discrimination system. The discrimination system 10 includes a camera 101 and an automatic discriminator 102 at a production site. The camera 101 is disposed on, for example, a production line of a factory, and images a discrimination target 200, such as material and a product to be, for example, inspected or classified. Image data (developed image data) output from the camera 101 is supplied to the automatic discriminator 102.

The automatic discriminator 102 inspects and classifies the discrimination target 200 on the basis of the image data, and outputs the result as a discrimination result. Here, an image quality parameter group P is used as an image quality parameter group set by a development processing unit of the camera 101. As described later, the image quality parameter group P is determined by a camera image quality adjustment system 100 so that the discrimination success rate of the automatic discriminator 102 is increased.

Figure 2:
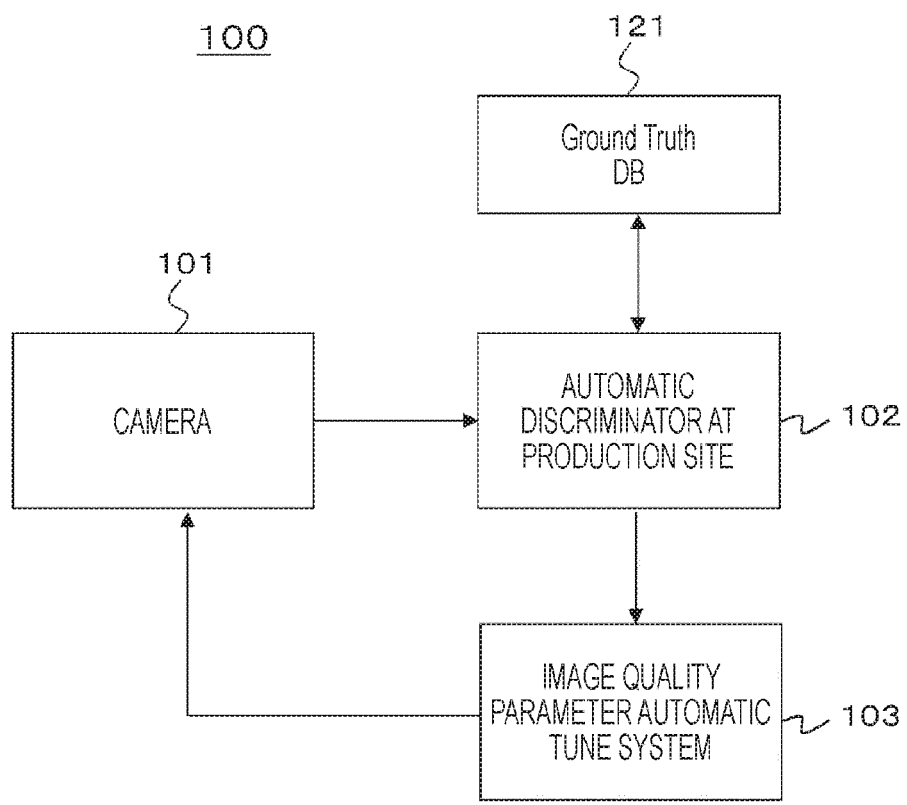
FIG. 2 is a block diagram illustrating a configuration example of a camera image quality adjustment system.

FIG. 2 illustrates a configuration example of the camera image quality adjustment system 100 exhibited as an embodiment. The camera image quality adjustment system 100 includes the camera 101, the automatic discriminator 102, and an image quality parameter automatic tuning system 103. Note that the automatic discriminator 102 includes a ground truth database (Ground Truth DB) 121. The ground truth database 121 has a plurality of combinations of an image and a correct answer discrimination result for the image.

Figure 3:
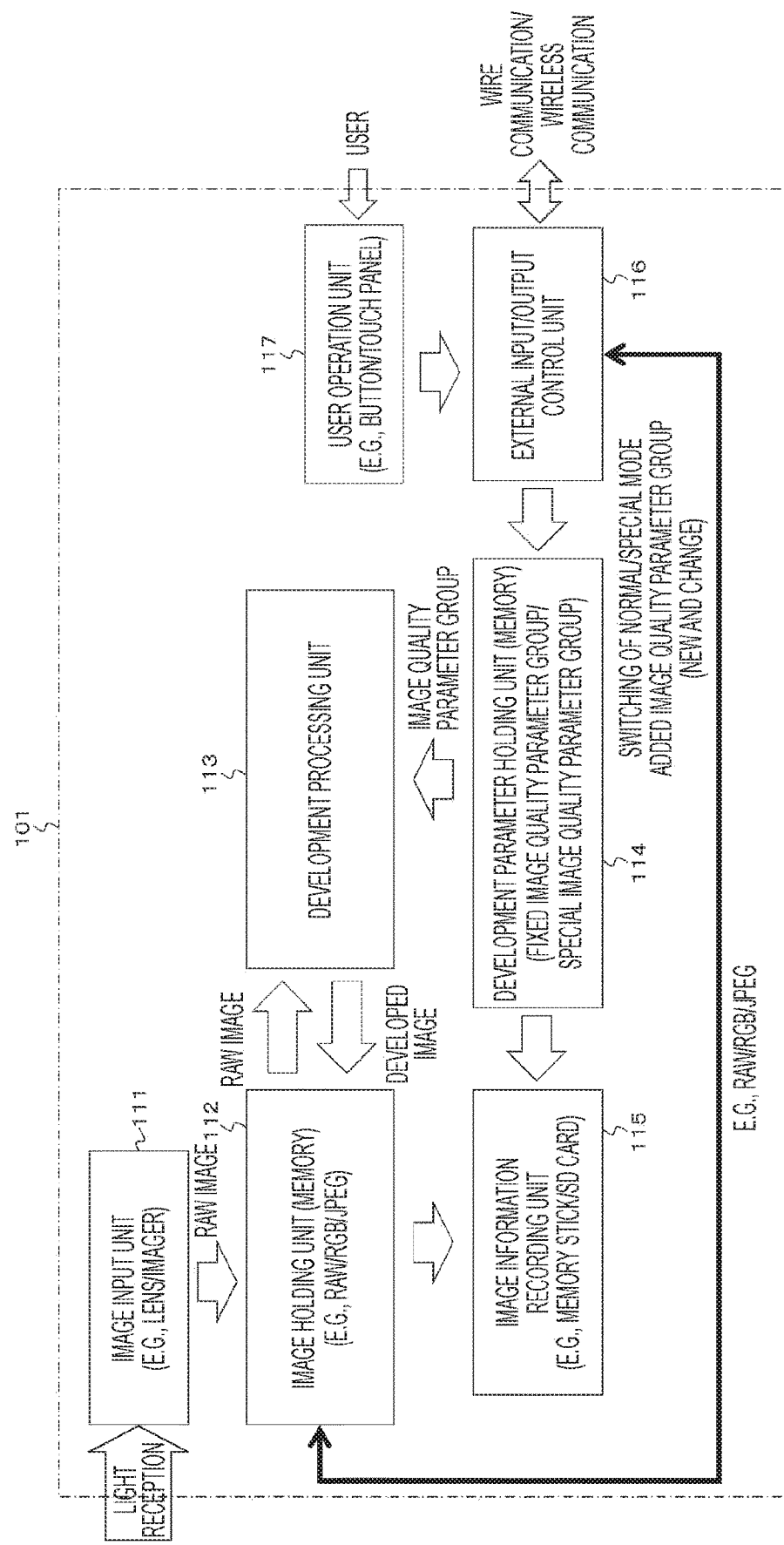
FIG. 3 is a block diagram illustrating a configuration example of a camera.

The camera 101 constitutes the above-described discrimination system 10. FIG. 3 illustrates a configuration example of the camera 101. The camera 101 includes an image input unit 111, an image holding unit (memory) 112, a development processing unit 113, a development parameter holding unit (memory) 114, an image information recording unit 115, an external input/output control unit 116, and a user operation unit 117.

The image input unit 111 includes, for example, a lens and an imager. The imager outputs RAW image data as captured image data. The image holding unit 112 holds the RAW image data output from the imager. In automatic tuning processing, the camera image quality adjustment system 100 in FIG. 2 determines an image quality parameter group in accordance with the automatic discriminator 102. In the automatic tuning processing, a plurality of images in the ground truth database 121 provided in the automatic discriminator 102 is captured, and a plurality of pieces of RAW image data for parameter adjustment is held in the image holding unit 112.

The development processing unit 113 performs development processing on the RAW image data held in the image holding unit 112, and outputs the developed image data. The image holding unit 112 also holds the developed image data output from the development processing unit 113. In automatic tuning processing of determining an image quality parameter group in accordance with the automatic discriminator 102, development processing is performed on a plurality of pieces of RAW image data for parameter adjustment, and a plurality of piece of developed image data for parameter adjustment is held in the image holding unit 112.

The development parameter holding unit 114 holds the image quality parameter group used at the development processing unit 113. Here, the development parameter holding unit 114 can hold a special image quality parameter group in addition to a fixed image quality parameter group. The special image quality parameter group is used in a special mode in which a developed image to be, for example, inspected and classified is supplied to the automatic discriminator 102. The fixed image quality parameter group is used in a normal mode.

Note that it is assumed that there is a plurality of automatic discriminators of different types of discriminations, or that environments such as lighting at a production site are different even if the same automatic discriminators are used, and thus not only one but a plurality of special image quality parameter groups can be held. At that time, each special image quality parameter group is held in association with the discrimination type and the usage environment.

Figure 4:
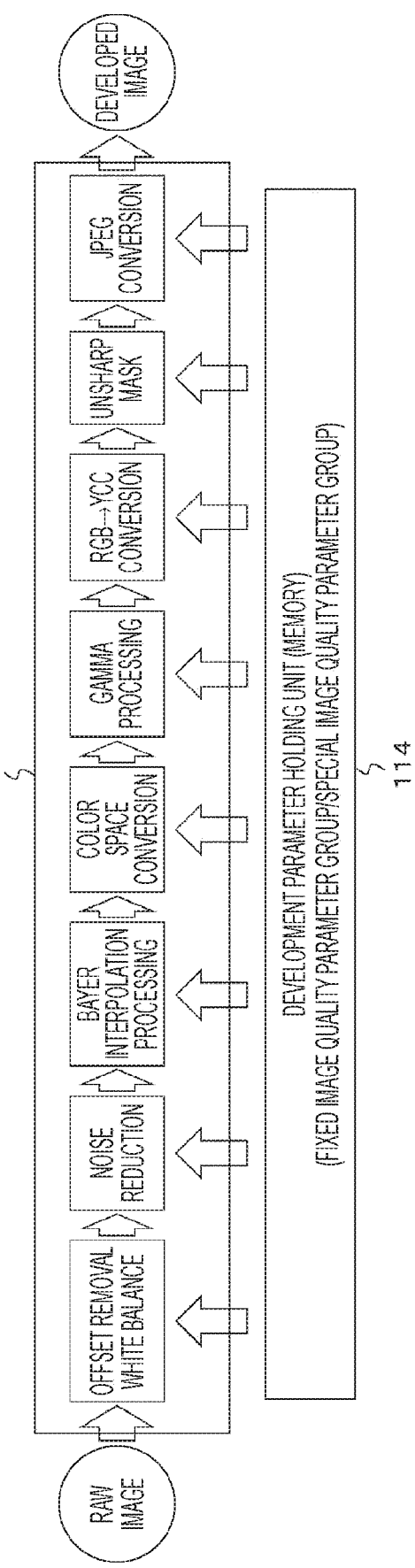
FIG. 4 is a block diagram illustrating a configuration example of a development processing unit.

FIG. 4 illustrates a configuration example of the development processing unit 113. The development processing unit 113 includes, for example, an offset removal/white balance unit, a noise reduction unit, a Bayer interpolation processing unit, a color space conversion unit, a gamma processing unit, an RGB/YCC conversion unit, an unsharp mask unit, and a JPEG conversion unit. Note that, although, in the illustrated example, only typical processing blocks are illustrated, there are enormous number of other processing blocks in an actual camera. Furthermore, some cameras sometimes do not use a part of processing blocks in the illustrated example.

An image quality parameter (development parameter) is used for processing in a processing block, and has influence on, for example, color reproducibility, resolution, and noise feeling of developed image data. The image quality parameter changes the image quality of the developed image data. The image quality parameter exists in most processing blocks, and complicatedly changes in accordance with the characteristics and mode of a camera. The development parameter holding unit 114 holds all of the image quality parameters, and switches the image quality parameter group to be passed to the development processing unit 113 in accordance with, for example, the mode.

Returning to FIG. 3, the image information recording unit 115 records the RAW image data and the developed image data held in the image holding unit 112 in, for example, a memory stick and an SD card, which are removable media, as necessary. Furthermore, the image information recording unit 115 records the image quality parameter group held in the development parameter holding unit 114 in, for example, a memory stick and an SD card, which are removable media, as necessary.

The external input/output control unit 116 accesses the image holding unit 112 to read out the RAW image data and the developed image data, and sends these pieces of data to an external device by wire communication or wireless communication. Furthermore, the external input/output control unit 116 receives the special image quality parameter group from the external device by wire communication or wireless communication, and writes the special image quality parameter group in the development parameter holding unit 114. In this case, a new special image quality parameter group can be written in the development parameter holding unit 114. The special image quality parameter group can be changed by overwriting the existing special image quality parameter group.

The user operation unit 117 includes, for example, a button and a touch panel, and allows a user to perform various operations. For example, the user can perform an operation to set the operation mode of the development processing unit 113 to the normal mode or the special mode. Furthermore, for example, in a case where there is a plurality of special image quality parameter groups used in the special mode, an operation to select which operation is to be used can be performed.

Further, for example, the user can perform an operation of transmitting the RAW image data and the developed image data held in the image holding unit 112 to the external device. Furthermore, for example, the user can perform operations of receiving an image quality parameter group from the external device and writing the image quality parameter group in the development parameter holding unit 114. Moreover, for example, the user can perform an operation of deleting the special image quality parameter group held in the development parameter holding unit 114.

Returning to FIG. 2, a plurality of piece of developed image data for parameter adjustment is transmitted from the camera 101 to the automatic discriminator 102 in the automatic tuning processing of determining the image quality parameter group in accordance with the automatic discriminator 102. The automatic discriminator 102 constitutes the discrimination system 10 in FIG. 1. The automatic discriminator 102 performs discrimination on the basis of each piece of developed image data, and outputs a discrimination result. Furthermore, the automatic discriminator 102 compares each discrimination result with the correct answer discrimination result in the ground truth database 121 to determine a discrimination success rate. Note that the discrimination success rate may be determined not by the automatic discriminator 102 but by a discrimination success rate calculator outside the automatic discriminator 102.

In order to increase the discrimination success rate, the image quality parameter automatic tuning system 103 calculates an image quality parameter group in the development processing unit 113 of the camera 101 on the basis of the discrimination success rate determined by the automatic discriminator 102 by using a non-linear optimization algorithm such as genetic algorithms (GA) and simulated annealing (SA). The image quality parameter group obtained by the image quality parameter automatic tuning system 103 is reflected in the development processing unit 113 of the camera 101. The image quality parameter automatic tuning system 103 may use a neural network or an algorithm such as deep learning.

The image quality parameter automatic tuning system 103 repeatedly obtains the image quality parameter group on the basis of the new discrimination success rate, optimizes the image quality parameter group, and calculates the optimum image quality parameter group. Finally, the camera 101 holds the optimum image quality parameter group calculated by the image quality parameter automatic tuning system 103 in the development parameter holding unit 114 as a special image quality parameter group, and uses the optimum image quality parameter group in the special mode in which a developed image to be, for example, inspected and classified is supplied to the automatic discriminator 102.

Figure 5:
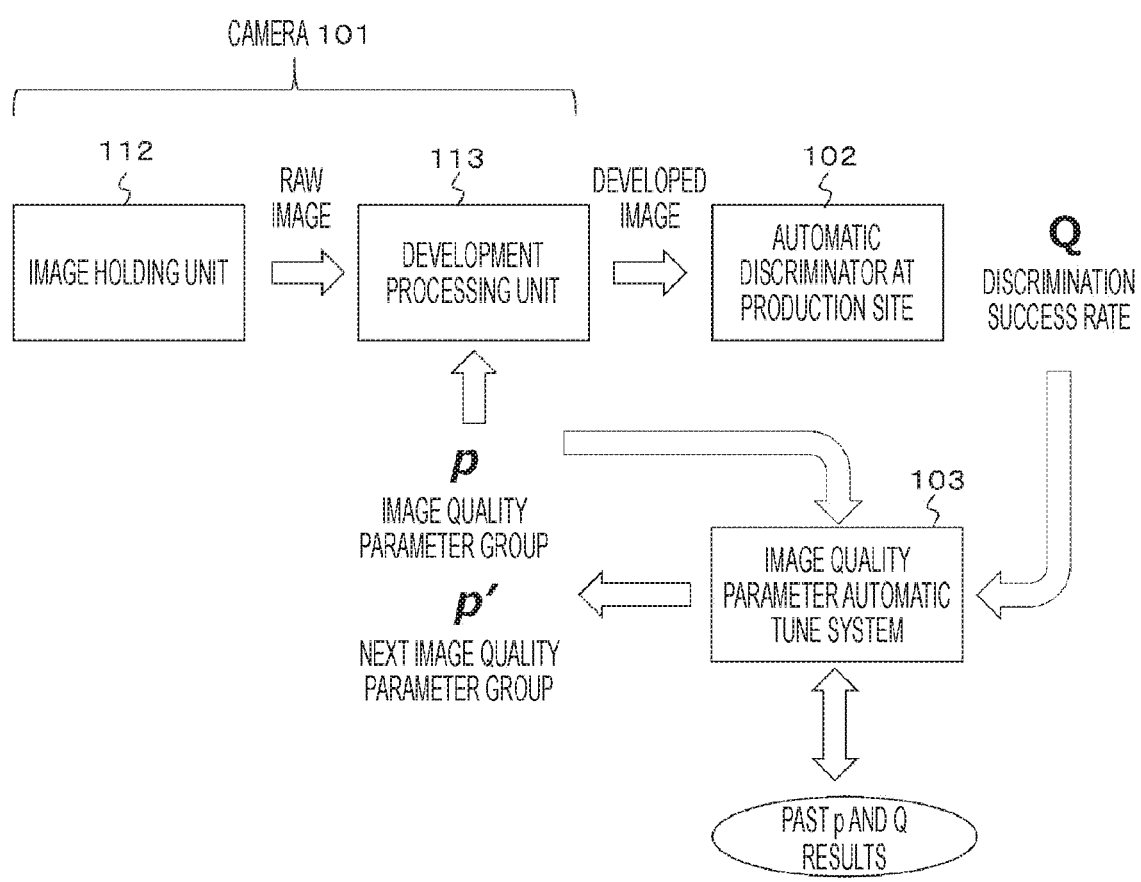
FIG. 5 illustrates automatic tuning processing.

The above-described automatic tuning processing will be further described with reference to FIG. 5. The image quality parameter group P is set in the development processing unit 113. In that state, development processing is performed on a plurality of pieces of RAW image data for parameter adjustment, and a plurality of pieces of developed image data for parameter adjustment is obtained. Then, the automatic discriminator 102 performs discrimination on the basis of the plurality of pieces of developed image data, and a discrimination result is obtained. Each discrimination result is compared with the correct answer discrimination result in the ground truth database 121 to determine a discrimination success rate Q.

The discrimination success rate Q is supplied to the image quality parameter automatic tuning system 103. Furthermore, the image quality parameter group P is also supplied to the image quality parameter automatic tuning system 103. The image quality parameter automatic tuning system 103 calculates a next image quality parameter group P' on the basis of P and Q. The image quality parameter automatic tuning system 103 repeats the processing, and derives the image quality parameter group P that optimizes the discrimination success rate Q. Note that the image quality parameter automatic tuning system 103 may refer to past P and Q. In a case where the camera 101 constitutes the discrimination system 10 (see FIG. 1), the special mode is set, and the image quality parameter group P optimized in this way is set and used in the development processing unit 113.

Figure 6:
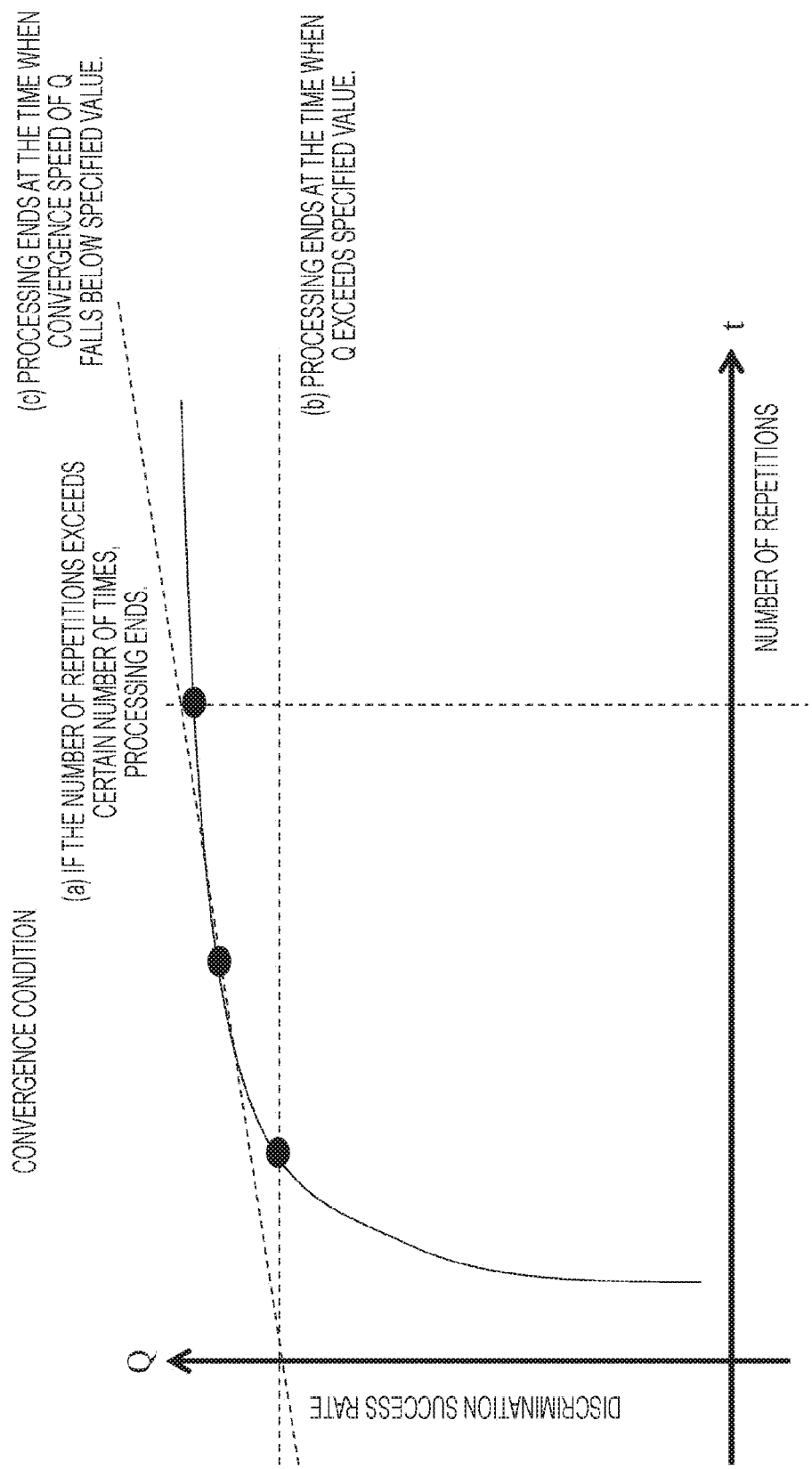
FIG. 6 illustrates a convergence condition in an image quality parameter automatic tuning system.

FIG. 6 illustrates one example of convergence conditions in the image quality parameter automatic tuning system 103. For example, the following (1) to (4) are possible as the convergence conditions. (1) If the number of repetitions exceeds a certain number of times, processing ends. (2) Processing ends at the time when the convergence speed of the discrimination success rate Q falls below a specified value. (3) Processing ends at the time when the discrimination success rate Q exceeds a specified value. Furthermore, a combination of (1) to (3) is possible as (4). For example, in a case where processing is repeated in accordance with, for example, (3), there is a possibility that the processing does not end. Therefore, the processing may be forcibly ended without satisfying (3) in a case where the specified number of times in (1) is exceeded. In that case, it is necessary to return, as information, the fact that under which condition the processing ends.

As described above, in the camera image quality adjustment system 100 in FIG. 2, the image quality parameter automatic tuning system 103 obtains an image quality parameter group in the development processing of the camera 101 so that the discrimination success rate of the automatic discriminator 102 is increased. Therefore, a preprocessing unit for enhancing the discrimination performance of the automatic discriminator 102 is unnecessary, and the performance of the automatic discriminator 102 can be improved at low cost. Furthermore, the same camera 101 can be reused in a plurality of automatic discriminators of different types of discriminations or a plurality of environments in which environments such as lighting at a production site are different.

<2. Variations>

Note that, in the above-described embodiment, the processing of the automatic discriminator 102 and the image quality parameter automatic tuning system 103 can be executed by hardware or software. In a case where the series of processing is executed by software, a program constituting the software is installed in a computer. The computer here includes, for example, a computer incorporated in dedicated hardware and a general-purpose personal computer capable of executing various functions by installing various programs.

Figure 7:
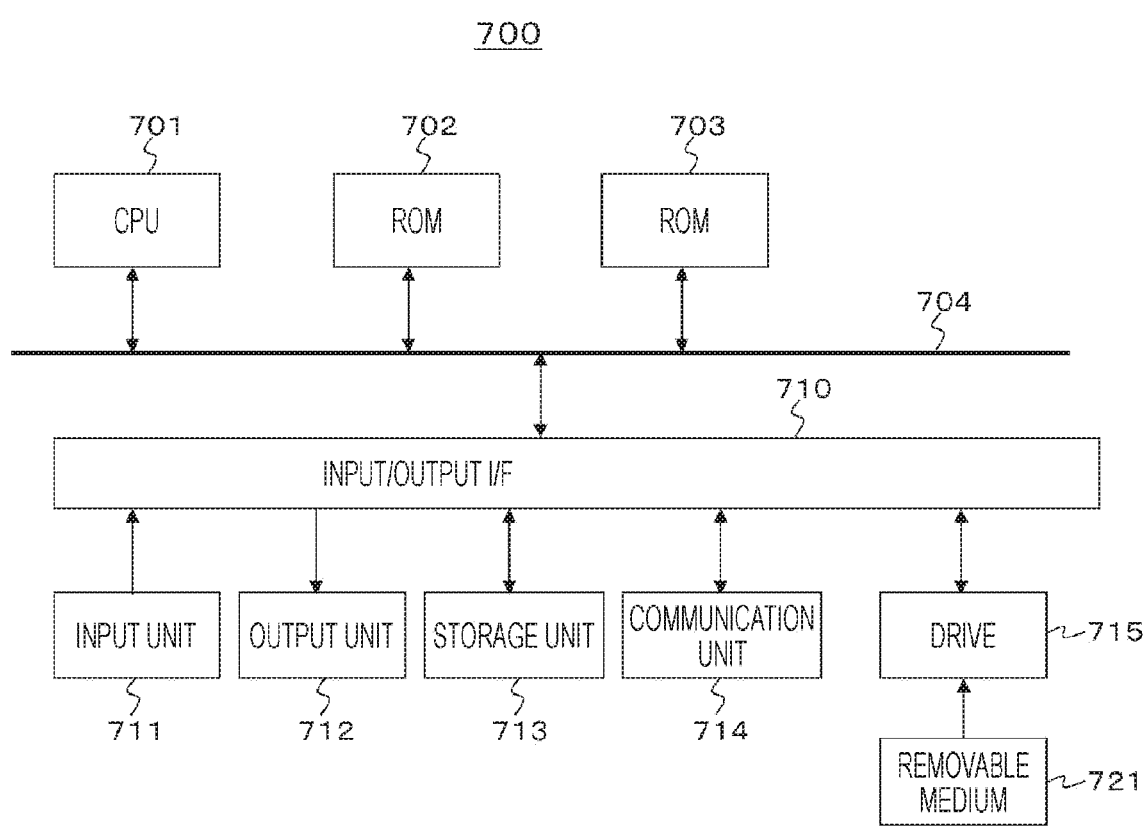
FIG. 7 is a block diagram illustrating a configuration example of a personal computer.

In FIG. 7, a central processing unit (CPU) 701 of a personal computer 700 performs various pieces of processing in accordance with a program stored in a read only memory (ROM) 702 or a program loaded from a storage unit 713 to a random access memory (RAM) 703. For example, data necessary for the CPU 701 to execute various pieces of processing is appropriately stored also in the RAM 703.

The CPU 701, the ROM 702, and the RAM 703 are connected to each other via a bus 704. An input/output interface 710 is also connected to the bus 704.

An input unit 711, a display, an output unit 712, the storage unit 713, and a communication unit 714 are connected to the input/output interface 710. The input unit 711 includes a keyboard, a mouse, and the like. The display includes a cathode ray tube (CRT), a liquid crystal display (LCD), and the like. The output unit 712 includes a speaker and the like. The storage unit 713 includes a hard disk and the like. The communication unit 714 includes a modem and the like. The communication unit 714 performs communication processing via a network including the Internet.

A drive 715 is also connected to the input/output interface 710 as needed. A removable medium 721 such as a magnetic disk, an optical disk, a magneto-optical disk, and a semiconductor memory is appropriately mounted. A computer program read therefrom is installed in the storage unit 713 as needed.

Furthermore, although the preferred embodiment of the disclosure has been described in detail with reference to the accompanying drawings, the technical scope of the disclosure is not limited to such an example. It is obvious that a person having ordinary skill in the art of the disclosure can arrive at various alternations or modifications within the scope of the technical ideas set forth in the claims. These alternations or modifications are understood to naturally fall within the technical scope of the disclosure.

Furthermore, the present technology can also have configurations as follows.

(1) An arithmetic device including
an image quality parameter group acquisition unit that acquires an image quality parameter group in development processing so that a discrimination success rate of a discriminator based on developed image data obtained by performing the development processing on captured image data is increased.

(2) The arithmetic device according to (1),
in which the discrimination success rate is obtained by comparing a discrimination result from the discriminator with a correct answer discrimination result in a ground truth database.

(3) The arithmetic device according to (1) or (2), further including
a discrimination success rate calculation unit that determines the discrimination success rate on the basis of a discrimination result of the discriminator.

(4) The arithmetic device according to any one of (1) to (3),
in which the image quality parameter group is a parameter that has influence on an image quality of the developed image data.

(5) The arithmetic device according to (3),
in which the image quality parameter group acquisition unit is allowed to repeat the image quality parameter group on the basis of the discrimination success rate which the discrimination success rate calculation unit is allowed to repeat.

(6) An arithmetic method including
a procedure of acquiring an image quality parameter group in development processing so that a discrimination success rate of a discriminator based on developed image data obtained by performing the development processing on captured image data is increased.

(7) A program causing a computer to function as an image quality parameter group acquisition apparatus that acquires an image quality parameter group in development processing so that a discrimination success rate of a discriminator based on developed image data obtained by performing image processing is increased.

(8) A discrimination system including:
a camera that performs development processing on imaged image data obtained by imaging a discrimination target, and outputs developed image data; and
a discriminator that discriminates the discrimination target on the basis of the developed image data, and outputs a discrimination result,
in which an image quality parameter group, which is calculated so that a discrimination success rate of the discriminator based on developed image data obtained by the camera is increased, is used as an image quality parameter group set in a development processing unit of the camera.

REFERENCE SIGNS LIST

10 Discrimination system
100 Camera image quality adjustment system
101 Camera
102 Automatic discriminator at a production site
103 Image quality parameter automatic tuning system
111 Image input unit
112 Image holding unit (memory)
113 development processing unit
114 Imaging parameter holding unit (memory)
115 Image information recording unit
116 External input/output control unit
117 User operation unit
121 Ground truth database
200 Discrimination target

The invention claimed is:

1. An arithmetic device, comprising:
a central processing unit (CPU) configured to:
acquire an image quality parameter group for development processing of captured image data such that a discrimination success rate of a discriminator circuit is increased, wherein
the discrimination success rate of the discriminator circuit is based on developed image data, and
the developed image data is obtained by execution of the development processing on the captured image data; and
determine the discrimination success rate based on a discrimination result of the discriminator circuit.

2. The arithmetic device according to claim 1, wherein the discriminator circuit obtains the discrimination success rate based on a comparison of the discrimination result of the discriminator circuit with a correct answer discrimination result in a ground truth database.

3. The arithmetic device according to claim 1, wherein the image quality parameter group corresponds to a parameter that has influence on an image quality of the developed image data.

4. The arithmetic device according to claim 1, wherein the CPU is further configured to repeat the acquisition of the image quality parameter group based on the discrimination success rate.

5. An arithmetic method, comprising:
in an arithmetic device that includes a central processing unit (CPU):
acquiring, by the CPU, an image quality parameter group for development processing of captured image data such that a discrimination success rate of a discriminator circuit is increased, wherein
the discrimination success rate of the discriminator circuit is based on developed image data, and
the developed image data is obtained by execution of the development processing on the captured image data; and
determining, the discrimination success rate based on a discrimination result of the discriminator circuit.

6. A non-transitory computer-readable medium having stored thereon computer-executable instructions, that when executed by a processor, cause the processor to execute operations, the operations comprising:
acquiring an image quality parameter group for development processing of captured image data such that a discrimination success rate of a discriminator circuit is increased, wherein the discrimination success rate of the discriminator circuit is based on developed image data, and
the developed image data is obtained by execution of the development processing on the captured image data; and
determining the discrimination success rate based on a discrimination result of the discriminator circuit.

7. A discrimination system, comprising:
a camera configured to:
capture a discrimination target to obtain image data of the discrimination target;
execute development processing on the image data of the discrimination target; and output the developed image data;
a discriminator circuit configured to:
receive the developed image data output from the camera:
discriminate the discrimination target based on the received developed image data to obtain a discrimination result; and
output the discrimination result; and
a central processing unit configured to: calculate an image quality parameter group such that, a discrimination success rate of the discriminator circuit is increased, wherein the camera is further configured to execute the development processing based on the calculated image quality parameter group; and
determine the discrimination success rate based on the discrimination result of the discriminator circuit.

* * * * *